(12) United States Patent
Zhou et al.

(10) Patent No.: US 12,323,335 B2
(45) Date of Patent: Jun. 3, 2025

(54) SEQUENCE NUMBER SYNCHRONIZATION METHOD AND APPARATUS

(71) Applicant: Huawei Technologies Co., Ltd., Shenzhen (CN)

(72) Inventors: Xingwang Zhou, Nanjing (CN); Feng Li, Nanjing (CN); Yizhou Li, Nanjing (CN); Jianfei He, Shenzhen (CN); Chaoyang Ji, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 497 days.

(21) Appl. No.: 17/705,882

(22) Filed: Mar. 28, 2022

(65) Prior Publication Data

US 2022/0217093 A1  Jul. 7, 2022

Related U.S. Application Data

(63) Continuation of application No. PCT/CN2020/116584, filed on Sep. 21, 2020.

(30) Foreign Application Priority Data

Sep. 27, 2019 (CN) .......................... 201910923968.4

(51) Int. Cl.
*H04L 12/18* (2006.01)
*H04J 3/06* (2006.01)
(Continued)

(52) U.S. Cl.
CPC ............ *H04L 47/34* (2013.01); *H04J 3/0658* (2013.01); *H04J 3/0697* (2013.01); *H04L 69/22* (2013.01)

(58) Field of Classification Search
CPC ....... H04L 47/34; H04L 69/22; H04L 69/169; H04L 47/32; H04L 7/0087; H04L 47/40; H04J 3/0658; H04J 3/0697
See application file for complete search history.

(56) References Cited

U.S. PATENT DOCUMENTS 7,603,418 B1    10/2009  Xu
7,664,855 B1 *   2/2010  Freed ................. H04L 63/1466
                                                            709/225
(Continued)

FOREIGN PATENT DOCUMENTS

CN        1422504 A     6/2003
CN      101138190 A     3/2008
(Continued)

OTHER PUBLICATIONS

M. Welzl et al, "LOOPS Generic Information Set," draft-welzl-loops-gen-info-00, May 27, 2019, 24 pages.

*Primary Examiner* — Lan-Huong Truong
(74) *Attorney, Agent, or Firm* — Conley Rose, P.C.

(57) ABSTRACT

A sequence number synchronization method includes a first network device sending a data packet including a first synchronization indication to a second network device, where the first synchronization indication is used to indicate the second network device and the first network device to perform a sequence number synchronization operation. The sequence number synchronization method further includes the first network device receiving a response packet from the second network device, where the response packet includes a second synchronization indication, and the second synchronization indication is used to indicate that the second network device has received the packet including the first synchronization indication.

20 Claims, 8 Drawing Sheets

(51) Int. Cl.
*H04L 47/34* (2022.01)
*H04L 69/22* (2022.01)

(56) References Cited

U.S. PATENT DOCUMENTS

| | | |
|---|---|---|
| 2001/0029188 A1 | 10/2001 | Sarkkinen et al. |
| 2008/0089250 A1 | 4/2008 | Jung |
| 2014/0310566 A1 | 10/2014 | Balakrishnan et al. |
| 2015/0156736 A1 | 6/2015 | Guo et al. |
| 2017/0279714 A1* | 9/2017 | White ................ H04L 45/74 |

FOREIGN PATENT DOCUMENTS

| | | | |
|---|---|---|---|
| CN | 103329467 A | 9/2013 | |
| CN | 105794284 A | 7/2016 | |
| EP | 2343851 A1 | 7/2011 | |
| EP | 3340717 A1 | 6/2018 | |
| WO | WO-2008054318 A2 * | 5/2008 | ......... H04L 12/1881 |
| WO | WO-2017074233 A1 * | 5/2017 | ........ H04W 56/0015 |
| WO | WO-2017078715 A1 * | 5/2017 | ........... H04L 45/745 |

\* cited by examiner

SEQUENCE NUMBER SYNCHRONIZATION METHOD AND APPARATUS

CROSS-REFERENCE TO RELATED APPLICATIONS

This is a continuation of International Patent Application No. PCT/CN2020/116584 filed on Sep. 21, 2020, which claims priority to Chinese Patent Application No. 201910923968.4 filed on Sep. 27, 2019. The disclosures of the aforementioned applications are hereby incorporated by reference in their entireties.

TECHNICAL FIELD

This application relates to the field of communication technologies, and in particular, to a sequence number synchronization method and apparatus.

BACKGROUND

An overlay segmented transport network is a communication network on which at least one intermediate forwarding node (overlay node) segments a communication link during a long-distance cross-wide area network (WAN) communication transmission, to improve end-to-end transmission performance by guaranteeing link quality of each segment. As shown in FIG. 1, a communication link between a transmit end and a receive end is divided, and intermediate nodes are set as an overlay node 1, an overlay node 2, and an overlay node 3. Transmission between the overlay node 1 and the overlay node 2 and between the overlay node 2 and the overlay node 3 is segmented transmission. Current problems are how to resolve sequence number synchronization on the overlay segmented transport network, and how to implement packet loss detection and packet recovery between a transmit end and a receive end on the overlay segmented transport network.

A current sequence number synchronization method is mainly determined by using a Transmission Control Protocol (TCP). A transmit end and a receive end of the TCP negotiate a sequence number by using a synchronization sequence number (SYN) and exchange of an acknowledgement (ACK) character packet, and then perform packet transmission.

However, the overlay segmented transport network between the intermediate nodes does not go through independent phases of establishing a connection and negotiating the sequence numbers. Consequently, a manner of performing sequence number synchronization by using TCP on the overlay segmented transport network affects forwarding of a data packet and causes a delay. This is not suitable for the overlay segmented transport network.

SUMMARY

This application provides a sequence number synchronization method and apparatus, to resolve a problem of sequence number synchronization on an overlay segmented transport network, trigger a sequence number resynchronization procedure, and avoid a delay in forwarding a data packet.

To achieve the foregoing objective, the following technical solutions are used in this application.

According to a first aspect, a sequence number synchronization method is provided, and may be applied to an overlay segmented transport network or a network between intermediate forwarding nodes on another communication network. The method includes: A first network device sends a data packet including a first synchronization indication to a second network device, where the first synchronization indication is used to indicate the second network device and the first network device to perform a sequence number synchronization operation. The first network device receives a response packet sent by the second network device, where the response packet includes a second synchronization indication, and the second synchronization indication is used to indicate that the second network device has received the packet including the first synchronization indication. Before the first network device receives a $1^{st}$ response packet including the second synchronization indication, the first network device sets the first synchronization indication in the data packet sent to the second network device.

In the foregoing technical solutions, at least one data packet sent by the first network device to the second network device includes the first synchronization indication used to indicate the first network device and the second network device to perform the sequence number synchronization operation. After receiving the data packet including the first synchronization indication, the second network device writes back the second synchronization indication in the corresponding response packet, to indicate that the sequence number synchronization operation of the first network device is received. This resolves a problem of sequence number synchronization between intermediate forwarding nodes in an in-band mode, avoids a separate sequence number negotiation procedure, and avoids a delay in forwarding a data packet.

In a possible design, the first synchronization indication is carried in at least one bit, and when the first network device receives the $1^{st}$ response packet including the second synchronization indication, the first network device continues sending a data packet that does not include the first synchronization indication to the second network device. In the foregoing possible implementation, the response packet received by the first network device and fed back by the second network device includes the second synchronization indication, a subsequently forwarded data packet may not include the first synchronization indication, and a normal data packet forwarding operation is performed. This is easy to implement and effectively resolves a problem of sequence number synchronization.

In a possible design, the first synchronization indication is carried in a first field, the first field includes at least one bit, and that the first network device sets the first synchronization indication in the data packet sent to the second network device specifically includes: The first network device sets a value of the first field to a first preset value, and updates the value of the first field when the first network device determines to perform a next sequence number synchronization operation. In the foregoing possible implementation, the first network device distinguishes the first synchronization indications for sequence number synchronization to the second network device by using different values. This is easy to implement, improves flexibility of the sequence number synchronization operation, and may detect whether the second network device misses receiving a sequence number synchronization operation.

In a possible design, that a first network device sends a data packet including a first synchronization indication to a second network device specifically includes: The first network device sets a sequence number in a $1^{st}$ data packet including the first synchronization indication to a preset sequence number or a random sequence number. The first network device continues sending a data packet until the first network device performs the next sequence number synchronization operation, where sequence numbers in the data packet that is continued to be sent are consecutive; and resets the sequence number in the data packet that is continued to be sent. In the foregoing possible implementation, when the first network device and the second network device perform the sequence number synchronization operation, the first network device resets the sequence number to the preset sequence number or the random sequence number, so that the second network device directly starts packet loss detection from the preset sequence number or the random sequence number. This effectively resolves a problem of sequence number synchronization and reliability detection of data packet forwarding.

In a possible design, that the first network device determines to perform the sequence number synchronization operation includes: The first network device determines to perform the sequence number synchronization operation when the first network device determines, based on a sequence number in the received response packet, that a sequence number of the data packet received by the second network device is greater than the sequence number in the data packet sent by the first network device. In the foregoing possible implementation, when the first network device detects a fed back sequence number of a data packet that is received by the second network device and that is not sent by the first network device, the first network device determines that a current sequence number between the first network device and the second network device is out of order, and a sequence number synchronization operation needs to be performed. Therefore, flexibility and timeliness of starting the sequence number synchronization operation can be effectively improved.

In a possible design, that the first network device determines to perform the sequence number synchronization operation includes: The first network device determines to perform the sequence number synchronization operation if the first network device is initialized or the first network device restarts. In the foregoing possible implementation, the first network device determines, based on a device status and a network status, whether to start the sequence number synchronization operation. Therefore, flexibility and timeliness of starting the sequence number synchronization operation can be effectively improved.

In a possible design, the data packet sent by the first network device to the second network device includes an overlay tunnel header, and the first synchronization indication and the sequence number of the data packet are encapsulated in the overlay tunnel header of the data packet. In the foregoing possible implementation, the first synchronization indication and the sequence number of the data packet are encapsulated in the overlay tunnel header of the data packet. This implements the sequence number synchronization operation between forwarding nodes on the overlay segmented transport network, is easy to implement, and improves flexibility of the sequence number synchronization operation.

According to a second aspect, a sequence number synchronization method is provided, and is applied to a network device. The network device is configured to forward a packet. The method includes: A first network device sends at least two data packets including first synchronization indications to a second network device, where the first synchronization indication is used to indicate the second network device and the first network device to perform a sequence number synchronization operation, and sequence numbers of the at least two data packets including the first synchronization indications are consecutive.

In a possible design, the first network device sends a preset quantity of data packets including the first synchronization indications to the second network device. Alternatively, the first network device sends at least two data packets including the first synchronization indications to the second network device within a preset time range. Alternatively, before the first network device receives a $1^{st}$ response packet including a second synchronization indication, the first network device sets the first synchronization indication in all data packets sent to the second network device. The second synchronization indication is used to indicate that the second network device has received the packet including the first synchronization indication.

In the foregoing possible implementation, the first network device sends a plurality of data packets including the first synchronization indications, to perform the sequence number synchronization operation with the second network device. Sequence number synchronization between the first network device and the second network device can start when the second network device receives a $1^{st}$ data packet including the first synchronization indication. The operation is simple.

In the foregoing technical solution, the first network device directly uses the data packet to perform sequence number synchronization, and sequence number synchronization does not affect data packet forwarding. In addition, the first network device sends at least two data packets including the first synchronization indications. Even if a packet is lost, sequence number synchronization can be performed as long as the second network device receives one data packet carrying the first synchronization indication. In this way, the second network device can identify whether a packet loss occurs and notify the first network device of a packet loss status. The first synchronization indication may be a fixed value of a packet header field, or there may be a sudden change in the value of the packet header field, or the like. The sequence number in the foregoing technical solutions is used for packet loss detection between the first network device and the second network device, and is not generally an end-to-end sequence number of a packet. Sequence number fields between different network devices may reuse a same field. When forwarding a packet, the first network device resets the sequence number based on a local sequence number status. When receiving and forwarding the packet, the second network device may also reset the sequence number based on a local sequence number status.

According to a third aspect, a sequence number synchronization method is provided, and is applied to a network device. The network device is configured to forward a packet. The method includes: A first network device receives at least one data packet including a first synchronization indication from a second network device, where the first synchronization indication is used to indicate the first network device and the second network device to perform a sequence number synchronization operation. If the first network device receives at least two data packets including the first synchronization indications, sequence numbers of the at least two data packets including the first synchronization indications are different.

In a possible design, after the first network device receives a $1^{st}$ data packet that is from the second network device and that includes the first synchronization indication, the method further includes: The first network device sends a response packet including a second synchronization indication to the second network device, where the second synchronization indication is used to indicate that the first network device receives the data packet including the first synchronization indication. The first synchronization indication corresponds to the second synchronization indication. If the first network device receives at least two data packets including the first synchronization indications, sequence numbers of the response packet that is sent by the first network device to the second network device and that includes the second synchronization indication are different.

In the foregoing possible implementation, when the first network device receives the at least one data packet that is sent by the second network device and that includes the first synchronization indication, the first network device determines to perform the sequence number synchronization operation with the second network device. In this way, packet loss detection may start from a sequence number of the received at least one data packet including the first synchronization indication, whether a packet loss occurs is identified, and a packet loss status is notified to the second network device. In addition, the first network device sends at least one response packet including the second synchronization indication to the second network device, where the second synchronization indication is used to indicate that the first network device receives a data packet that is from the second network device and that is used for a synchronization indication. The first network device starts packet loss detection based on a sequence number in the $1^{st}$ received data packet including the first synchronization indication. The first synchronization indication and the second synchronization indication may be a fixed value of a packet header field, may be a sudden change in the value of the packet header field, or the like. The first synchronization indication and the second synchronization indication may be the same or different. In the foregoing technical solutions, sequence number synchronization is performed by directly using a data packet, and an operation is simple.

According to a fourth aspect, a sequence number synchronization method is provided, and is applied to a network device. The network device is configured to forward a packet. The method includes: A first network device receives a data packet including a first synchronization indication sent by a second network device, where the first synchronization indication is used to indicate the first network device and the second network device to perform sequence number synchronization. The first network device sends a response packet to the second network device, where the response packet includes a second synchronization indication, and the second synchronization indication is used to indicate that the first network device receives the data packet including the first synchronization indication. The first synchronization indication corresponds to the second synchronization indication.

In a possible design, the method further includes: The first network device sends a response packet that does not include the second synchronization indication to the second network device when the first network device receives a data packet that is sent by the second network device and that does not include the first synchronization indication.

In a possible design, when the first network device consecutively receives at least two data packets that are sent by the second network device and that include the first synchronization indications, and sequence numbers included in the data packets are different, corresponding response packets sent by the first network device to the second network device include the second synchronization indications, where the response packet further includes a sequence number corresponding to the data packet.

In a possible design, the data packet received by the first network device and sent by the second network device includes an overlay tunnel header, and the first synchronization indication and a sequence number of the data packet are encapsulated in the overlay tunnel header.

According to a fifth aspect, a sequence number synchronization apparatus is provided. The apparatus may be a first network device, and the apparatus includes: a sending unit, configured to send a data packet including a first synchronization indication to a second network device, where the first synchronization indication is used to indicate the second network device and the first network device to perform a sequence number synchronization operation; and a receiving unit, configured to receive a response packet sent by the second network device, where the response packet includes a second synchronization indication, and the second synchronization indication is used to indicate that the second network device has received the packet including the first synchronization indication. Before the first network device receives a $1^{st}$ response packet including the second synchronization indication, the sending unit is further configured to set the first synchronization indication in the data packet sent to the second network device.

In a possible design, the first synchronization indication is carried in at least one bit. When the first network device receives the $1^{st}$ response packet including the second synchronization indication, the sending unit is further configured to continue sending a data packet that does not include the first synchronization indication to the second network device.

In a possible design, the first synchronization indication is carried in a first field, and the first field includes at least one bit. The sending unit is further specifically configured to: set a value of the first field to a first preset value, and update the value of the first field when the apparatus determines to perform a next sequence number synchronization operation.

In a possible design, the sending unit is further specifically configured to: set a sequence number in a $1^{st}$ data packet including the first synchronization indication to a preset sequence number or a random sequence number; continue sending a data packet until the apparatus determines to perform the next sequence number synchronization operation, where sequence numbers in the data packet that is continued to be sent are consecutive; and reset the sequence number in the data packet that is continued to be sent.

In a possible design, the apparatus further includes a determining unit, configured to: determine to perform the sequence number synchronization operation when determining, based on a sequence number in the received response packet, that a sequence number of the data packet received by the second network device is greater than the sequence number in the data packet sent by the first network device.

In a possible design, the determining unit is further configured to: determine to perform the sequence number synchronization operation if the first network device is initialized or the first network device restarts.

In a possible design, the data packet sent by the sending unit to the second network device includes an overlay tunnel header, and the first synchronization indication and the sequence number of the data packet are encapsulated in the overlay tunnel header of the data packet.

According to a sixth aspect, a sequence number synchronization apparatus is provided. The apparatus may be a second network device, and the apparatus includes: a receiving unit, configured to receive a data packet including a first synchronization indication sent by the second network device, where the first synchronization indication is used to indicate a first network device and the second network device to perform sequence number synchronization; and a sending unit, configured to send a response packet to the second network device, where the response packet includes a second synchronization indication, and the second synchronization indication is used to indicate that the first network device receives the data packet including the first synchronization indication. The first synchronization indication corresponds to the second synchronization indication.

In a possible design, when receiving a data packet that is sent by the second network device and that does not include the first synchronization indication, the sending unit is further configured to send a response packet that does not include the second synchronization indication to the second network device.

In a possible design, when the receiving unit consecutively receives at least two data packets that are sent by the second network device and that include the first synchronization indications, and sequence numbers included in the data packets are different, corresponding response packets sent by the sending unit to the second network device include the second synchronization indications, where the response packet further includes a sequence number corresponding to the data packet.

In a possible design, the data packet received by the receiving unit and sent by the second network device includes an overlay tunnel header, and the first synchronization indication and a sequence number of the data packet are encapsulated in the overlay tunnel header.

According to a seventh aspect, a readable storage medium is provided. The readable storage medium stores instructions, and when the instructions are run on a computer or a processor, the computer or the processor is enabled to perform the sequence number synchronization method according to any possible design of the first aspect.

According to an eighth aspect, a computer program product is provided. When the computer program product runs on a computer, the computer is enabled to perform the sequence number synchronization method according to any possible design of the first aspect.

According to a ninth aspect, a sequence number synchronization apparatus is provided. The apparatus includes one or more processors, a memory, and a communication interface. The memory and the communication interface are coupled to the one or more processors. The apparatus communicates with another device through the communication interface. The memory is configured to store computer program code, and the computer program code includes instructions. When the one or more processors execute the instructions, the apparatus performs the sequence number synchronization method according to the first aspect and the possible implementations of the first aspect.

It may be understood that any of the sequence number synchronization method and apparatus, a computer storage medium, and a computer program product that are provided above may be implemented by using the corresponding method provided above. Therefore, for beneficial effects that can be achieved, refer to beneficial effects in the corresponding method provided above. Details are not described herein again.

DESCRIPTION OF EMBODIMENTS

Figure 1:
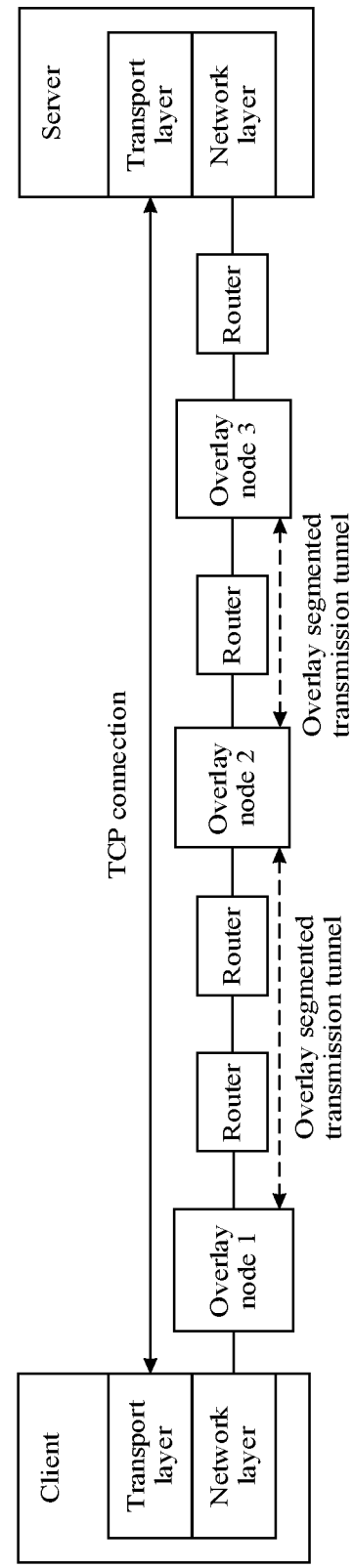
FIG. 1 is a diagram of a system architecture of a communication network according to an embodiment of this application.

In the specification, claims, and accompanying drawings of this application, the terms "first", "second", "third" and the like are intended to distinguish different objects but do not limit a particular sequence. In embodiments of this application, the word "example" or "for example" is used to represent giving an example, an illustration, or a description. Any embodiment or design scheme described as "example" or "for example" in the embodiments of this application should not be explained as being more preferred or having more advantages than another embodiment or design scheme. Specifically, use of the word such as "example" or "for example" is intended to present a related concept in a specific manner.

The following clearly describes the technical solutions in the embodiments of this application with reference to the accompanying drawings in the embodiments of this application. It is clear that the described embodiments are merely some but not all of the embodiments of this application. All other embodiments obtained by a person of ordinary skill in the art based on the embodiments of this application without creative efforts shall fall within the protection scope of this application.

Before the embodiments of this application are described, a design technology is briefly described first.

A best effort service is a service model that provides a minimum performance guarantee. This service model is a unitary and simplest service model. Applications under the best effort service can send any quantity of packets at any time without prior approval or notification to a network. For the best effort service, the network makes best efforts to send a packet, but does not ensure performance such as delay and reliability.

Forward error correction (FEC) is a method used to increase data communication reliability. In a one-way communication channel, once an error is detected, a receiver cannot request transmission again. FEC is a method of transmitting redundant information by using data. If an error occurs during transmission, the receiver may be allowed to re-establish the data.

A tunnel is a mechanism that makes payload transmission feasible on incompatible transport networks. The tunnel allows network users to gain access to denied or insecure networks. The tunnel can use data encryption for payload transmission, to ensure that encapsulated user network data is displayed as public data even if the user network data is private and ensure that the user network data can easily pass through an insecure network.

The embodiments of this application may be applied to a communication network, specifically, an overlay segmented transport network architecture. For example, the overlay segmented transport network architecture may be applied between intermediate forwarding nodes shown in FIG. 1, such as between an overlay node 1 and an overlay node 2. Overlay in network technology field refers to a virtualization technology mode overlaid on network structures. Overlay realizes carrying applications on networks and separating the applications from another network service without large-scale modification of network infrastructures. Overlay mainly involves internet-based basic network technologies. The overlay technology constructs a virtual network on top of an existing physical network. Upper-layer applications are related only to the virtual network. An overlay network mainly includes the following three parts: an edge device: a device directly connected to a virtual machine; a control plane: mainly responsible for establishing and maintaining virtual tunnels and advertising host reachability information; and a forwarding plane: a physical network that carries packet transmission between forwarding nodes on an overlay segmented transport network.

It should be noted that only best effort packet loss detection and recovery are performed between forwarding nodes on the overlay segmented transport network. To be specific, there is no 100% reliability guarantee for data transmission between the overlay node 1 and the overlay node 2 shown in FIG. 1. The intermediate forwarding node makes best efforts to send a packet, detect a missed packet, and retransmit the packet. A TCP between a transmit end and a receive end ensures 100% reliability of data transmission on the network. The transmit end may be a client, and the receive end may be a server. A TCP connection is established between the transmit end and the receive end at a transport layer, an overlay segmented transport network is established at a network layer between the transmit end and the receive end, and forwarding and detection of a data packet are implemented via a plurality of overlay nodes and routers.

Further, the intermediate node on the overlay segmented transport network is configured to forward a packet, and needs to ensure continuity of packet forwarding. Therefore, the overlay nodes have no concept of establishing a connection, and consequently there is no independent phase of establishing a connection and negotiating a sequence number. Therefore, this application proposes an in-line sequence number synchronization method. A sequence number synchronization operation is carried in a forwarded data packet, that is, the sequence number synchronization operation between overlay nodes is completed by using an in-band sequence number synchronization method, so that continuity of data packet forwarding is not affected, and a delay in forwarding a data packet is avoided.

The intermediate forwarding node in the foregoing embodiments of this application may be a virtual machine, a router, a switch, a physical server, an x86 virtualized forwarding device, or the like. This is not specifically limited in this application.

Optionally, each network element in FIG. 1 in the embodiments of this application, for example, the overlay node 1, may be a functional module in a device. It may be understood that the functional module may be a network element in a hardware device, for example, a communication chip in a mobile phone, may be a software function running on dedicated hardware, or may be a virtual function instantiated on a platform (for example, a cloud platform).

Figure 2:
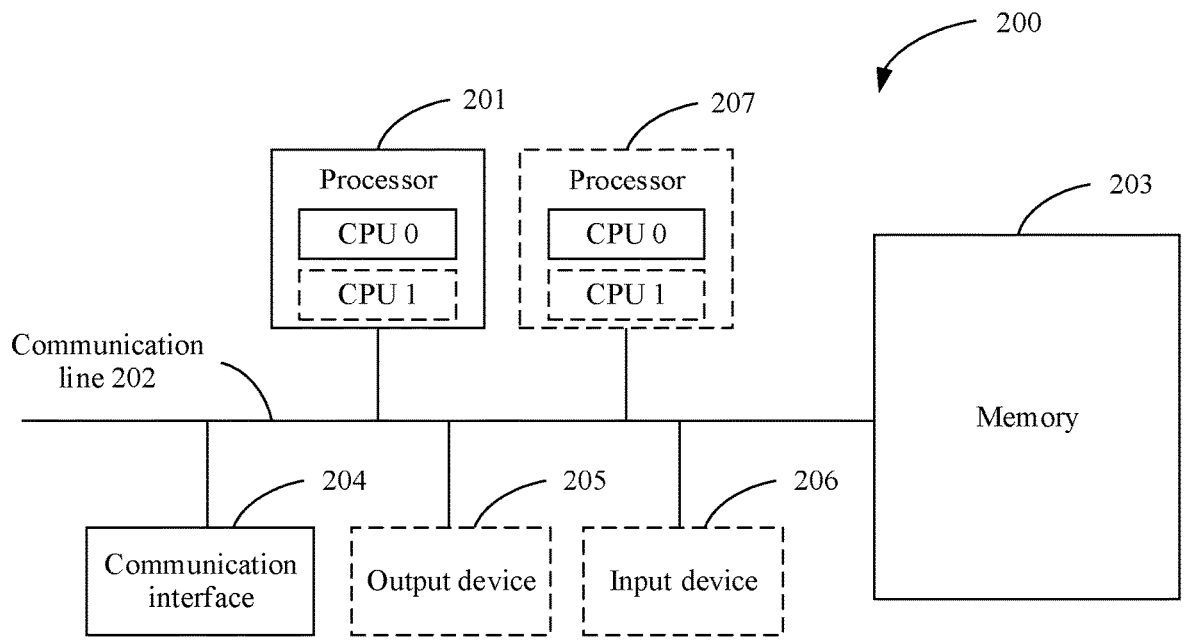
FIG. 2 is a schematic diagram of a hardware structure of a network device according to an embodiment of this application.

For example, each network element in FIG. 1 may be implemented by using the network device 200 in FIG. 2. FIG. 2 is a schematic diagram of a hardware structure of a network device applicable to the embodiments of this application. The network device 200 may include at least one processor 201, a communication line 202, a memory 203, and at least one communication interface 204.

The processor 201 may be a general-purpose central processing unit (CPU), a microprocessor, an application-specific integrated circuit (ASIC), or one or more integrated circuits configured to control execution of programs in the solutions in this application.

The communication line 202 may include a path such as a bus for transmitting information between the foregoing components.

The communication interface 204 is configured to communicate with another device or a communication network by using any apparatus such as a transceiver, and is, for example, an Ethernet interface, a radio access network (RAN) interface, or a wireless local area network (WLAN) interface.

The memory 203 may be a read-only memory (ROM) or another type of static storage device that can store static information and instructions, a random-access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer, but is not limited thereto. The memory may exist independently, and is connected to the processor through the communication line 202. The memory may alternatively be integrated with the processor. The memory provided in this embodiment of this application may usually be non-volatile. The memory 203 is configured to store computer-executable instructions for executing the solutions in this application, and execution is controlled by the processor 201. The processor 201 is configured to execute the computer-executable instructions stored in the memory 203, to implement the method provided in the embodiments of this application.

In some embodiments, the computer-executable instructions in the embodiments of this application may also be referred to as application program code. This is not specifically limited in this embodiment of this application.

During specific implementation, in an embodiment, the processor 201 may include one or more CPUs, for example, the CPU 0 and the CPU 1 in FIG. 2.

During specific implementation, in an embodiment, the communication device 200 may include a plurality of processors, for example, the processor 201 and a processor 207 in FIG. 2. Each of the processors may be a single-core processor (single-CPU) or a multi-core processor (multi-CPU). The processor herein may be one or more devices, circuits, and/or processing cores configured to process data (for example, computer program instructions).

During specific implementation, in an embodiment, the communication device 200 may further include an output device 205 and an input device 206. The output device 205 communicates with the processor 201, and may display information in a plurality of manners. For example, the output device 205 may be a liquid-crystal display (LCD), a light-emitting diode (LED) display device, a cathode-ray tube (CRT) display device, or a projector. The input device 206 communicates with the processor 201, and may receive a user input in a plurality of manners. For example, the input device 206 may be a mouse, a keyboard, a touchscreen device, or a sensing device.

During specific implementation, the communication device 200 may be a desktop computer, a portable computer, a network server, a palmtop computer (e.g., a personal digital assistant (PDA)), a mobile phone, a tablet computer, a wireless terminal device, an embedded device, or a device with a structure similar to that in FIG. 2. A type of the communication device 200 is not limited in the embodiments of this application.

The following specifically describes the sequence number synchronization method provided in the embodiments of this application with reference to FIG. 1 and FIG. 2. The network device in the following embodiments may include the components shown in FIG. 2.

It should be noted that in the following embodiments of this application, names of messages forwarded between network devices, names of parameters in messages, or the like are merely examples, and there may be other names during specific implementation. This is not specifically limited in the embodiments of this application.

It may be understood that, in the embodiments of this application, a network device may perform some or all of steps in the embodiments of this application. The steps are merely examples. In the embodiments of this application, other steps or variations of various steps may further be performed. In addition, the steps may be performed in a sequence different from a sequence presented in the embodiments of this application, and not all steps in the embodiments of this application need to be performed.

Figure 3:
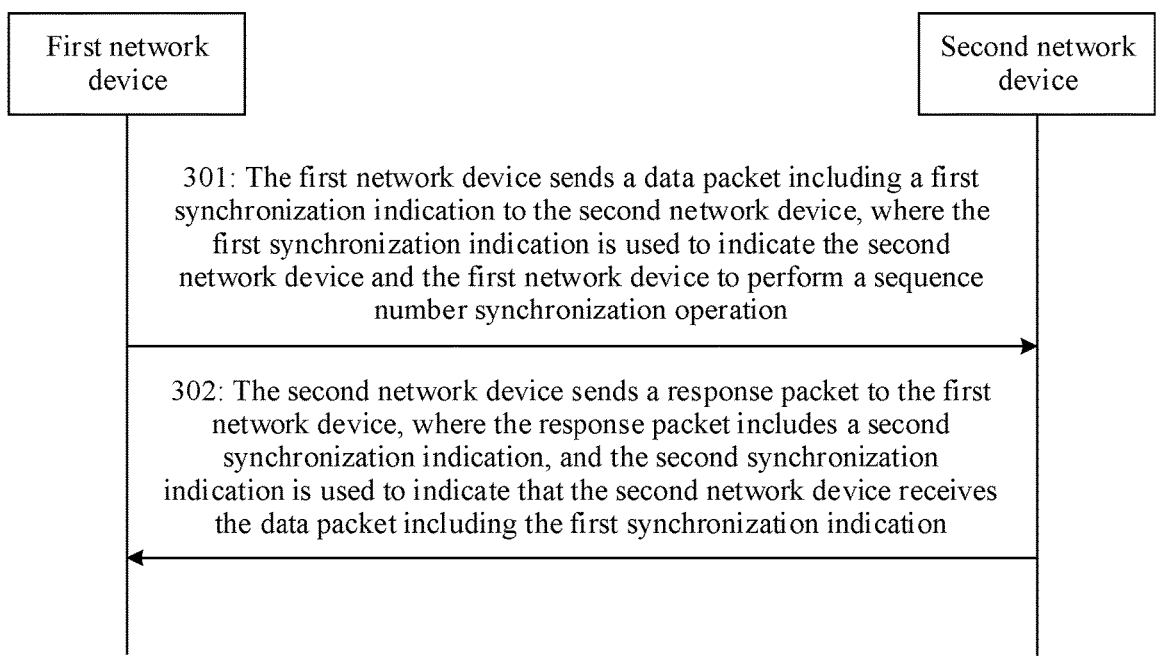
FIG. 3 is a schematic flowchart of a sequence number synchronization method according to an embodiment of this application.

An embodiment of this application provides a sequence number synchronization method. When a transmit end needs to resynchronize a sequence number, a synchronization indication bit indicating to perform a sequence number synchronization operation is set in a forwarded data packet, so that a sequence number negotiation process does not need to be performed separately. This resolves a problem of sequence number synchronization on an overlay segmented transport network, and avoids a delay in forwarding a data packet. As shown in FIG. 3, a first network device is used as a transmit end, a second network device is used as a receive end, and the first network device forwards a data packet to the second network device. The embodiments of this application may include the following steps.

301: The first network device sends the data packet including a first synchronization indication to the second network device, where the first synchronization indication is used to indicate the second network device and the first network device to perform a sequence number synchronization operation.

It should be noted that the sequence number synchronization operation may be performed by the first network device and the second network device after the first network device and the second network device are initialized, after the first network device restarts and is powered on again, after a network between the first network device and the second network device is recovered from a network error or network disconnection, or the like. In the foregoing several cases, the first network device may trigger the sequence number synchronization operation with the second network device. Different processing in the different cases in the embodiments of this application is separately described below.

The data packet may be a data packet that is to be forwarded by the first network device and that includes a user payload, and is different from a packet used to only perform a specific request or indication between devices in another transport network.

Further, the data packet sent by the first network device to the second network device may be a data packet including an overlay tunnel header generated after a to-be-forwarded data packet is encapsulated. The first synchronization indication and a sequence number are encapsulated in the overlay tunnel header of the data packet. Specifically, after receiving the to-be-forwarded data packet from a previous node, the first network device processes the to-be-forwarded data packet according to an overlay tunnel transmission protocol, encapsulates the first synchronization indication and the sequence number into the overlay tunnel header of the to-be-forwarded data packet, and forwards the to-be-forwarded data packet to the second network device.

The first synchronization indication may be carried in at least one bit. For example, the first synchronization indication may be carried in one bit. A value of the bit is set to 1, indicating that the first network device initiates a sequence number resynchronization operation to the second network device. The value of the bit is set to 0, indicating that the first network device and the second network device end the sequence number synchronization operation. A specific form of the first synchronization indication and a corresponding embodiment are described in detail below.

302: The second network device sends a response packet to the first network device, where the response packet includes a second synchronization indication, and the second synchronization indication is used to indicate that the second network device receives the data packet including the first synchronization indication.

The second synchronization indication corresponds to the first synchronization indication. The second synchronization indication may be carried in a bit that is the same as the bit in which the first synchronization indication in the data packet is carried, or may be carried in a different bit. The second synchronization indication and the first synchronization indication may be preset to a same value, or may be separately set to different values. This is not specifically limited in this embodiment of this application. Any indication that can indicate the first network device and the second network device to perform the sequence number synchronization operation falls within the protection scope of this application.

It should be noted that the response packet sent by the second network device to the first network device may be a simple response packet, for example, an ACK character or a negative acknowledgement (NACK) character packet, used to indicate that the second network device receives the data packet sent by the first network device, or that the second network device receives no data packet sent by the first network device. In addition, the ACK/NACK packet may carry a sequence number of a received data packet, a sequence number of a next data packet expected to be received, or may alternatively include a list of sequence numbers of a data packet that is not received, which is also referred to as a NACK list. In addition, the response packet sent by the second network device to the first network device may alternatively be a data packet in which an ACK/NACK is encapsulated and that is sent by the second network device to the first network device. This is not specifically limited in this embodiment of this application. For ease of describing principles of this application, for example, all response packets in the following embodiments are simple response packets, namely, ACK/NACK packets. Details are not described below.

Further, the response packet may one-to-one correspond to the data packet, or one response packet may correspond to a plurality of data packets. For example, the second network device may be configured to send a corresponding response packet to the first network device immediately after receiving a data packet sent by the first network device, where the response packet includes a sequence number of the received data packet. Alternatively, the second network device may be configured to reply to the first network device with one response packet after receiving two data packets sent by the first network device, where the response packet includes sequence numbers of the received data packets. Alternatively, the second network device may be preconfigured to reply to the first network device with a response packet within a specific time, where the response packet includes a sequence number of the data packet received by the second network device and sent by the first network device within the specific time. A specific implementation may be preset by a person skilled in the art based on a requirement.

In some embodiments, the second network device performs packet loss detection based on a synchronized sequence number. If a sequence number of a data packet sent by the first network device and received by the second network device is greater than a sequence number expected by the second network device, the second network device detects a data packet loss. In this case, the second network device sends a NACK response packet to the first network device, where the NACK response packet carries a NACK list, namely, inconsecutive sequence numbers of the received data packet. When receiving the NACK response packet sent by the second network device, the first network device may retransmit a lost data packet based on the NACK list in the NACK response packet.

It should be noted that, on an overlay segmented transport network, a forwarding node performs only a best effort retransmission service. To be specific, if a data packet whose sequence number is in the NACK list is in a retransmission queue of the first network device, the first network device performs a retransmission operation, and if there is no data packet whose sequence number is in the NACK list in the retransmission queue of the first network device, the first network device does not perform the retransmission operation, and continues forwarding a subsequent data packet.

Further, before the first network device receives a $1^{st}$ response packet including the second synchronization indication, the first network device sets the first synchronization indications in all data packets sent to the second network device.

In other words, the first network device keeps setting the first synchronization indications in the data packets forwarded to the second network device until the first network device receives the $1^{st}$ response packet that is sent by the second network device and that includes the second synchronization indication. In this way, it can be ensured that the second network device receives the data packet including the first synchronization indication, that is, the second network device receives a sequence number resynchronization operation performed by the first network device. This avoids that a sequence number cannot be synchronized due to a data packet loss.

Specifically, the first network device sets a sequence number in a $1^{st}$ data packet including the first synchronization indication to a preset sequence number or a random sequence number. The first network device continues sending a data packet until the first network device performs a next sequence number synchronization operation, where sequence numbers in the data packet that is continued to be sent are consecutive; and resets the sequence number in the data packet that is continued to be sent.

The preset sequence number indicates a start sequence number that exists when a sequence number resynchronization operation is performed. For example, the preset sequence number may be set to 0 or 1, or may be set to any value. As long as the first network device and the second network device come to an agreement in which when the sequence number resynchronization operation is performed, a sequence number of a data packet sent by the first network device to the second network device starts from the preset sequence number, and a sequence number that is expected by the second network device and that is of the data packet received by the second network device also starts from the preset sequence number. In this case, the second network device may perform packet loss detection based on the expected sequence number.

In addition, a random sequence number may be used to indicate the start sequence number when the sequence number resynchronization operation is performed. The random sequence number may be a random number generated by the first network device, or a sequence number generated by the first network device based on a parameter of the first network device such as a current moment, an Internet Protocol (IP) address, or a media access control (MAC) address. Therefore, this can effectively avoid a loss, tampering, or malicious attack of a data packet caused by maliciously embezzling of the preset sequence number of the communication network, to improve data transmission security.

When a sequence number set by the first network device to perform the sequence number synchronization operation starts from a random sequence number, the second network device may not restart sequence number synchronization and packet loss detection from the random sequence number, but from a sequence number included in a $1^{st}$ received data packet including the first synchronization indication. For example, the random sequence number is 12345. The first network device sends data packets 12345, 12346, 12347, and . . . to the second network device, where the data packet includes the first synchronization indication. The second network device receives the data packet 12347 including the first synchronization indication. In this case, the second network device starts sequence number synchronization and packet loss detection from the sequence number 12347.

In some possible embodiments, when the first network device determines to perform the sequence number synchronization operation, the first network device may send a preset quantity of data packets including the first synchronization indications to the second network device; and a data packet does not include the first synchronization indication when a quantity of data packets exceeds the preset quantity.

Alternatively, the first network device may continuously send data packets including the first synchronization indications to the second network device within a preset time range; and a data packet does not include the first synchronization indication when the preset time range is exceeded. The preset quantity and the preset time range may be manually set by a person skilled in the art based on a feature of a network device and a network status between network devices, to ensure that the second network device can receive at least one data packet that includes the first synchronization indication and that is sent by the first network device.

In this embodiment of this application, an implementation is described by using an example in which before the first network device receives a $1^{st}$ response packet including the second synchronization indication, the first network device sets the first synchronization indications in all data packets sent to the second network device. Alternatively, the first network device may send the preset quantity of data packets including the first synchronization indication to the second network device, or send the data packet including the first synchronization indication to the second network device within the preset time range. This does not impose a specific limitation on the protection scope of this application. Details are not described below.

Further, when the second network device consecutively receives at least two data packets that are sent by the first network device and that include the first synchronization indications, and sequence numbers included in the data packets are different, corresponding response packets sent by the second network device to the first network device include the second synchronization indications, where the response packet further includes a sequence number corresponding to the data packet.

For example, when the second network device receives a first data packet that is sent by the first network device and that includes the first synchronization indication, and a sequence number of the first data packet is x, the second network device sends a first response packet corresponding to the first data packet to the first network device. The first response packet includes the second synchronization indication, and may further include the received sequence number x or a next sequence number x+1 expected to be received. Then, the second network device further receives a second data packet that is sent by the first network device and that includes the first synchronization indication, and a sequence number of the second data packet is x+1, the second network device sends a second response packet corresponding to the second data packet to the first network device. The second response packet includes the second synchronization indication, and may further include the received sequence number x+1 or a next sequence number x+2 expected to be received.

In the embodiments of this application, the first synchronization indication is added to at least one data packet forwarded by the first network device to the second network device, to indicate the first network device and the second network device to perform the sequence number resynchronization operation. After the second network device receives the data packet including the first synchronization indication, the response packet sent to the first network device includes the second synchronization indication, so that the second network device starts packet loss detection from the preset sequence number or the random sequence number. The sequence number of the data packet is synchronized in an in-band mode. This avoids an impact of an extra sequence number synchronization negotiation phase on data packet forwarding. In addition, the second network device only needs to write back a specific bit indicating synchronization to complete a sequence number synchronization procedure. This is easy to implement, and effectively resolves problems of sequence number synchronization and data packet loss.

Figure 4:
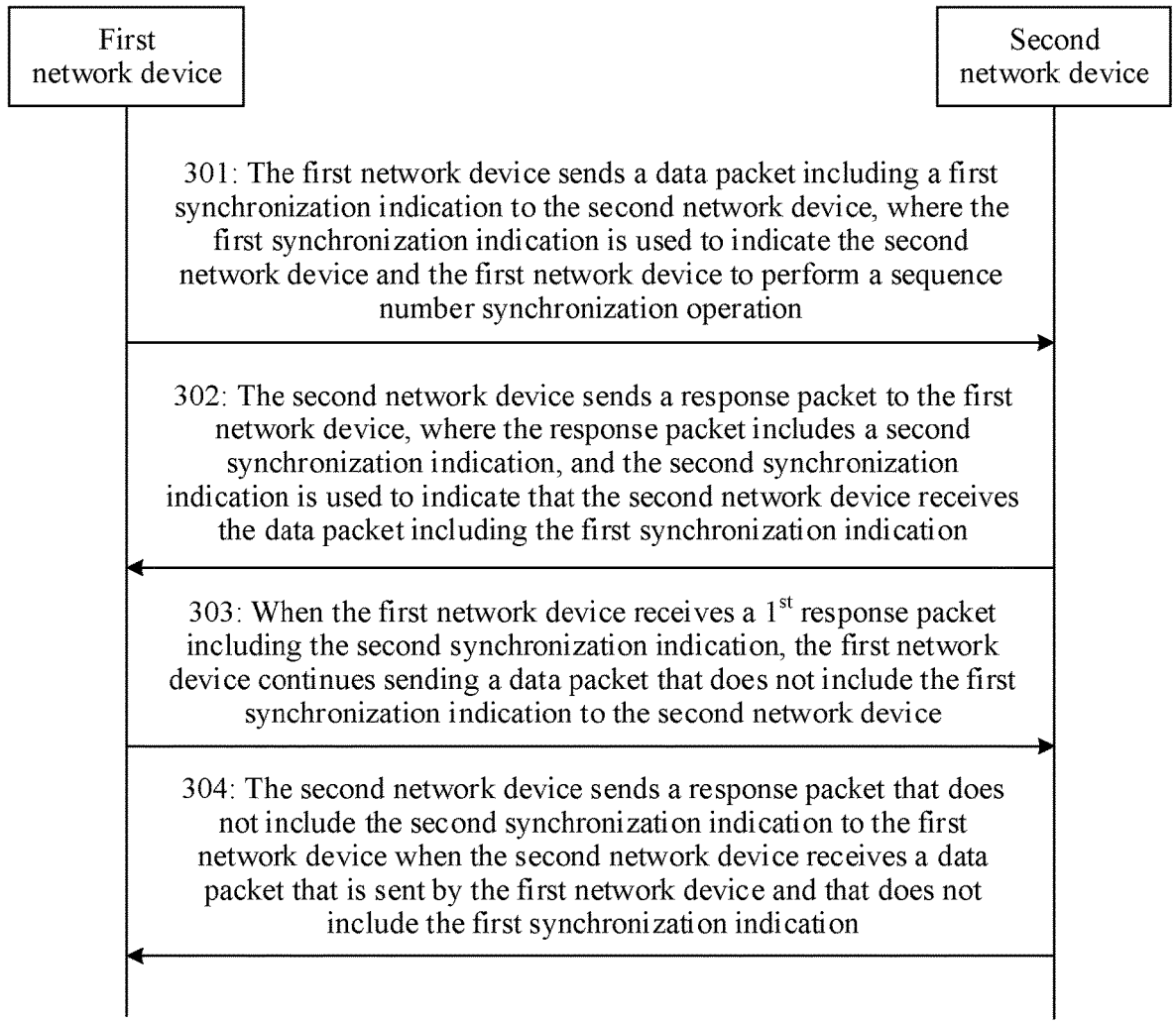
FIG. 4 is a schematic flowchart of another sequence number synchronization method according to an embodiment of this application.

In some embodiments, as shown in FIG. 4, after step 302, this embodiment of this application may further include the following steps.

303: When the first network device receives the $1^{st}$ response packet including the second synchronization indication, the first network device continues sending a data packet that does not include the first synchronization indication to the second network device.

304: The second network device sends a response packet that does not include the second synchronization indication to the first network device when the second network device receives a data packet that is sent by the first network device and that does not include the first synchronization indication.

The first synchronization indication is carried in at least one bit, and is set to a preset value. The second synchronization indication corresponds to the first synchronization indication. The data packet that is continued to be sent by the first network device to the second network device does not include the first synchronization indication in the following two implementations. One is to delete the bit of the first synchronization indication, that is, a subsequently sent data packet does not include the bit. The other is to set the bit corresponding to the first synchronization indication to another value, indicating that a sequence number synchronization operation is not currently performed. The following further describes these two cases in detail:

In a first implementation, for example, the first synchronization indication is carried in a first bit, and a value is not limited. The second synchronization indication is also carried in the first bit, and a value is not limited. When the first network device receives a $1^{st}$ response packet including the first bit, the data packet that is continued to be sent by the first network device to the second network device does not include the first bit. When the second network device receives a data packet that does not include the first bit, a corresponding response packet sent by the second network device to the first network device also does not include the first bit.

Figure 5:
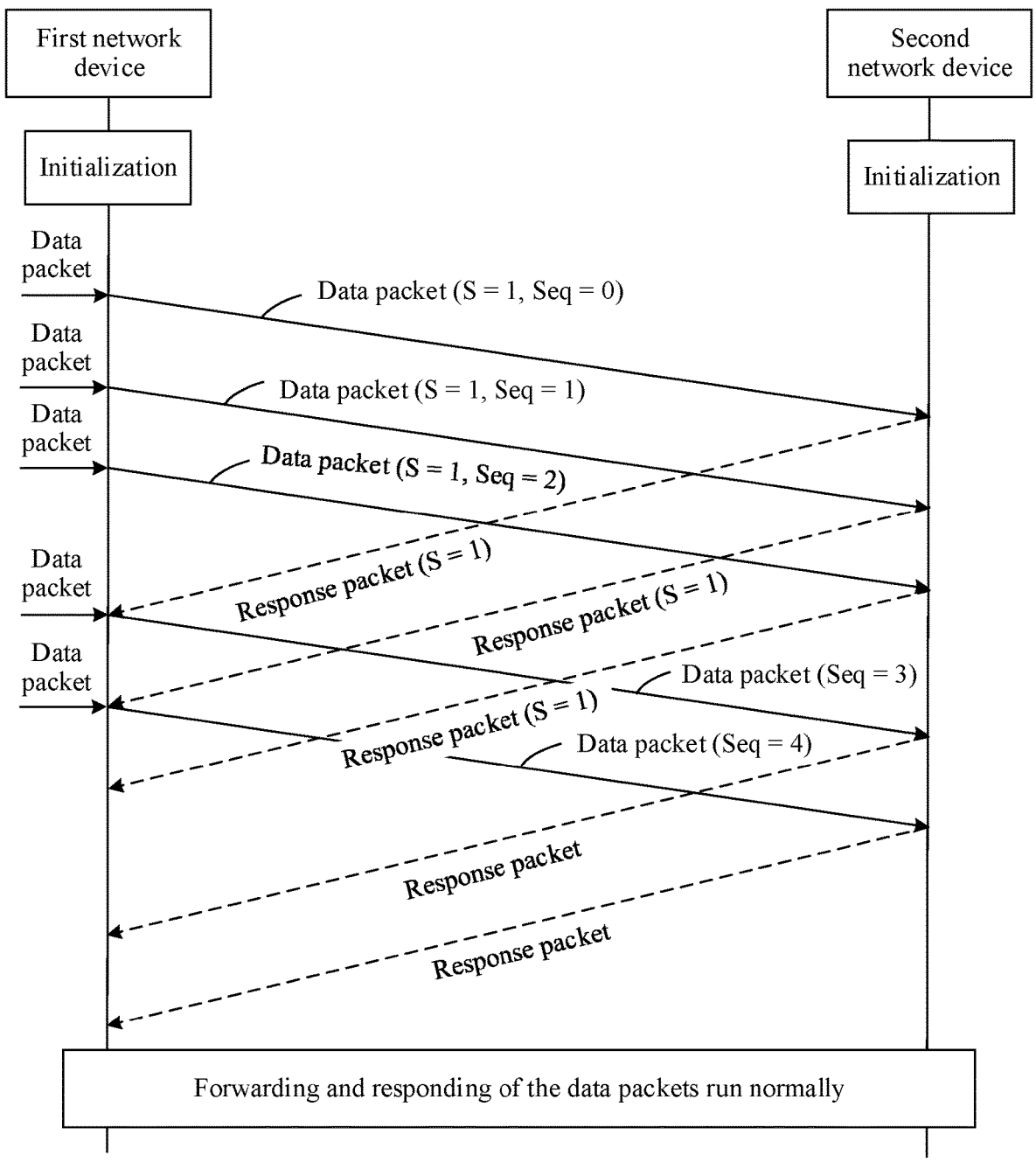
FIG. 5 is a schematic flowchart of another sequence number synchronization method according to an embodiment of this application.

As shown in FIG. 5, for example, the first bit of the first synchronization indication is set to 1, the first synchronization indication is represented by S, and a sequence number is represented by Seq. The first network device sends more than one data packet including the first synchronization indication S=1 to the second network device, where the sequence number Seq of the data packet starts from 0. If receiving a data packet that is sent by the first network device and that includes the first synchronization indication S=1 and Seq-0, the second network device writes back the first synchronization indication S=1 in a corresponding response packet, and the second network device starts packet loss detection from the sequence number 0. When the first network device receives the response packet that is sent by the second network device and that includes the first synchronization indication S=1, a subsequently forwarded data packet no longer includes the first synchronization indication S=1. In this case, when the second network device receives a data packet that is sent by the first network device and that does not include the first synchronization indication S=1, the first synchronization indication S=1 is removed from a corresponding response packet.

In a second implementation, for example, the first synchronization indication is carried in one bit and the bit is set to 1. The bit in the second synchronization indication is also set to 1. When the first network device receives a $1^{st}$ response packet including the second synchronization indication whose bit is 1, in a data packet that is continued to be sent by the first network device to the second network device, the bit corresponding to the first synchronization indication is set to another value, for example, 0. When the second network device receives a data packet that does not include the first synchronization indication whose bit is 1, and detects the bit corresponding to the first synchronization indication is 0, in a corresponding response packet sent by the second network device to the first network device, the bit corresponding to the second synchronization indication is also set to 0.

Figure 6:
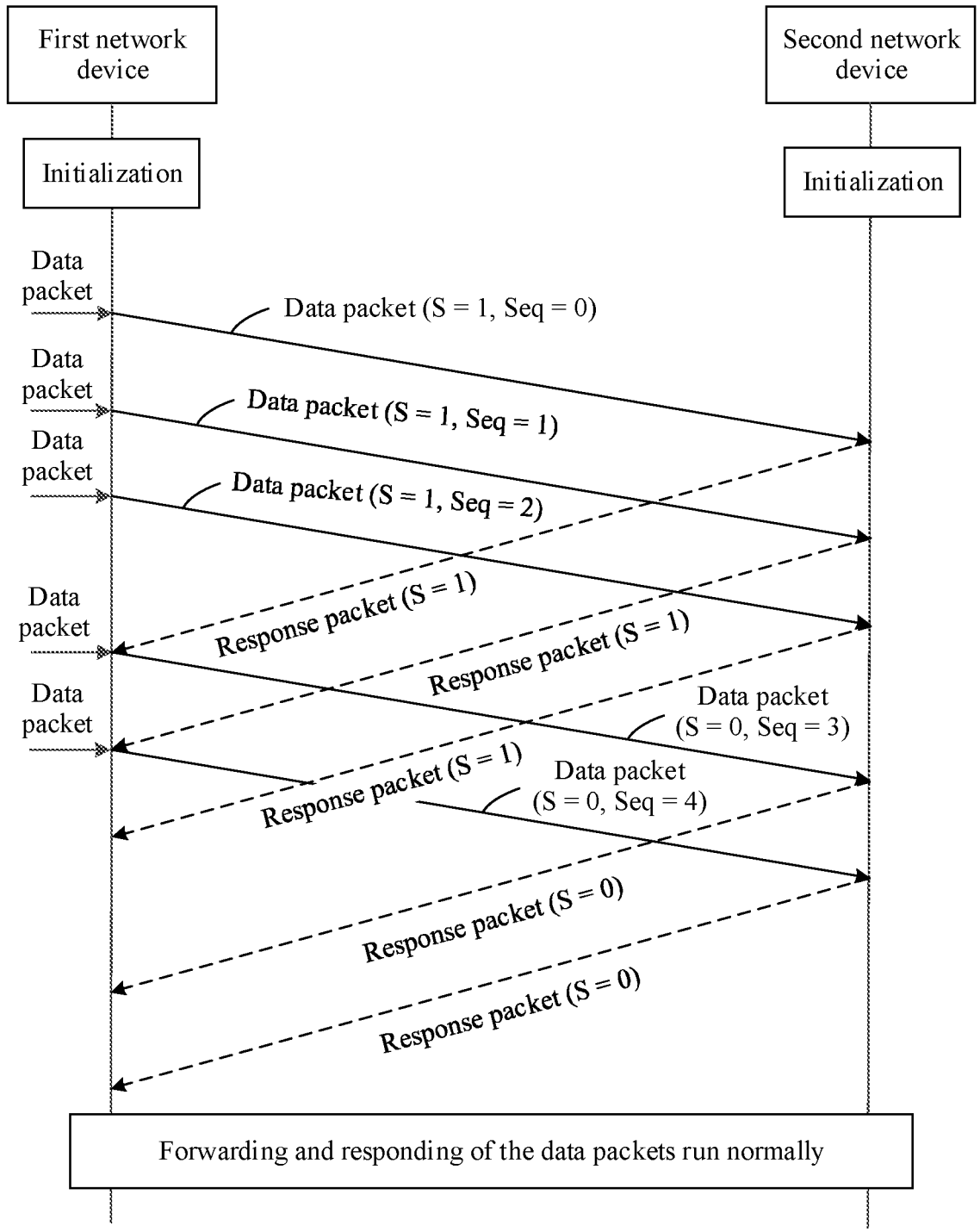
FIG. 6 is a schematic flowchart of another sequence number synchronization method according to an embodiment of this application.

As shown in FIG. 6, for example, the first bit of the first synchronization indication is set to 1. The first network device sends more than one data packet including the first synchronization indication S=1 to the second network device, where the sequence number Seq of the data packet starts from 0. If receiving a data packet that is sent by the first network device and that includes the first synchronization indication S=1, the second network device writes back the first synchronization indication S=1 in a corresponding response packet. When the first network device receives the response packet that is sent by the second network device and that includes the first synchronization indication S=1, S in a subsequently forwarded data packet is set to 0. In this case, when the second network device receives the data packet that is sent by the first network device and that includes S=0, S included in a corresponding response packet is also set to 0.

In some embodiments, the first synchronization indication in the embodiments of this application may be carried in a first field, and the first field includes at least one bit. In the foregoing embodiments, that the first network device sets the first synchronization indication in the data packet sent to the second network device may specifically include: The first network device sets a value of the first field to a first preset value.

In this case, after step 302, the embodiments of this application may further include: The first network device updates the value of the first field when determining to perform a next sequence number synchronization operation.

The first network device may determine to perform a next sequence number synchronization operation after the first network device restarts and is powered on again, after a network between the first network device and the second network device is recovered from a network error or network disconnection, or the like. This is not specifically limited in this embodiment of this application.

In other words, before the first network device determines to perform the next sequence number synchronization operation, the value of the first synchronization indication in the data packet sent by the first network device to the second network device does not change until the first network device determines to perform the next sequence number synchronization operation.

In some embodiments, each sequence number synchronization operation may be distinguished by using a plurality of bits. For example, the first synchronization indication is carried in four bits, and may represent 0 to 15, 16 different values in total. The 16 different values may be used to indicate a number of each sequence number synchronization operation, to identify each different sequence number synchronization operation. This prevents a receive end from missing receiving a packet of a sequence number synchronization operation.

For example, if the first synchronization indication is carried in four bits, and the first preset value is 0010, the first synchronization indication is 0010, and the second synchronization indication in a response packet may also be set to 0010. When the first network device determines to perform the next sequence number synchronization operation, the first network device may update a value of a first field in a next to-be-forwarded data packet to 0011, and send the data packet to the second network device. If the value of the first field in the data packet received by the second network device is 0011, a corresponding response packet sent by the second network device to the first network device also includes the first field whose value is 0011.

In some embodiments, when the first network device restarts or the first network device is powered on again after being powered off, a sequence number status between the first network device and the second network device is lost. In this case, the first network device directly initiates a sequence number synchronization procedure, and starts packet loss detection from the preset sequence number with the second network device. After receiving a data packet including the bit that is of the first synchronization indication and that is reset to an original value, the second network device sends a response packet to the first network device, where the sequence number synchronization indication is written back in the response packet. In addition, the second network device resets an expected sequence number, and resets or clears a sequence number list of lost packets, to indicate that the second network device starts to perform packet loss detection and retransmission from the preset sequence number again.

Figure 7:
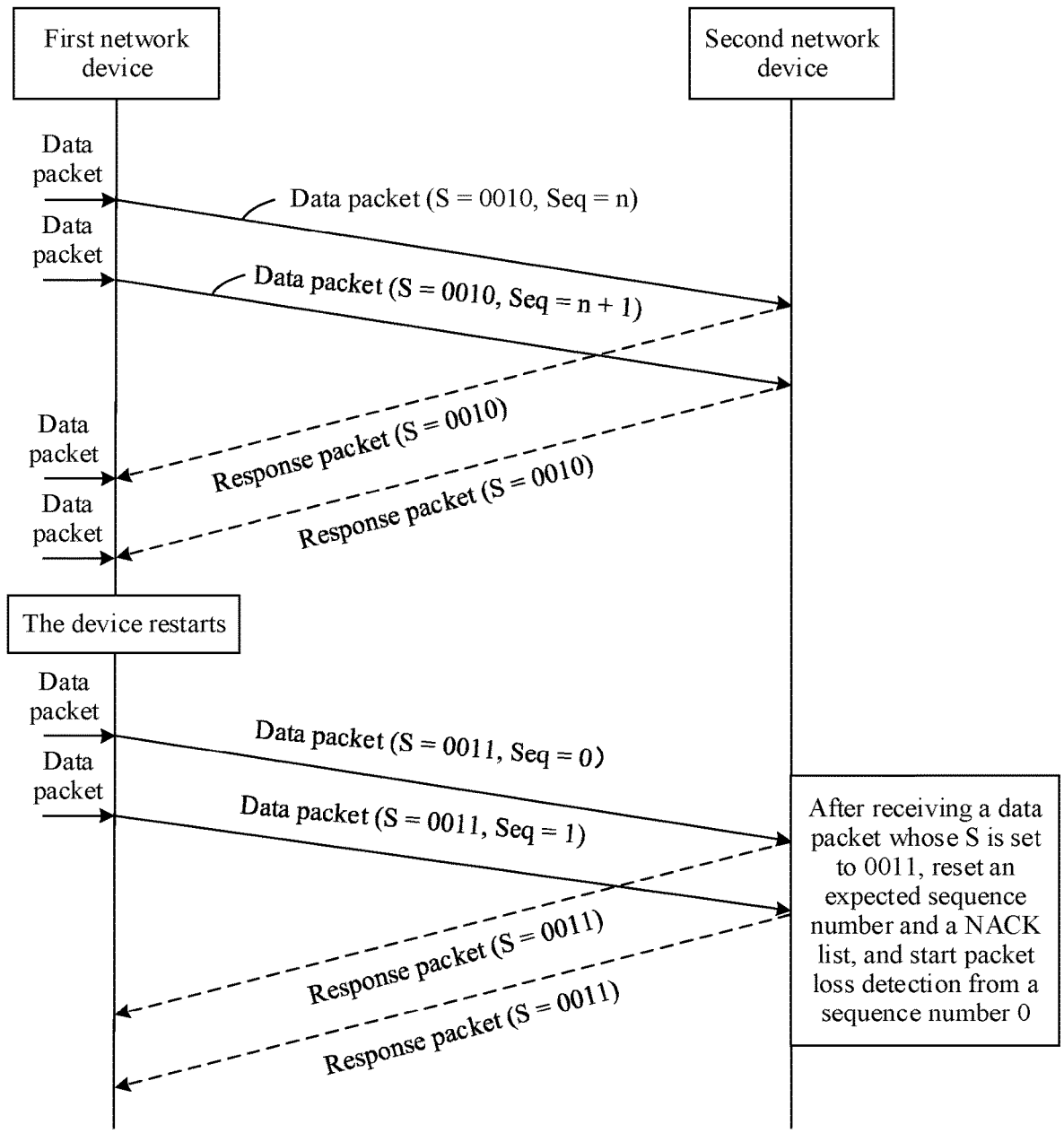
FIG. 7 is a schematic flowchart of another sequence number synchronization method according to an embodiment of this application.

As shown in FIG. 7, S in a data packet sent by the first network device to the second network device is 0010, and a sequence number Seq is n+1. The second network device receives the data packet, and S in a returned response packet is 0010. In this case, a sequence number of a next data packet that the second network device expects to receive is n+2. In this case, the first network device restarts and initiates the sequence number synchronization procedure, S in a data packet sent by the first network device to the second network device is reset to 0011, and a sequence number is Seq-0. After receiving the data packet of S=0011, the second network device determines to currently perform a sequence number synchronization operation. In this case, the expected sequence number and a NACK list are reset, packet loss detection is started from the sequence number 0, and S in a response packet sent to the first network device is also set to 0011.

In some embodiments, when the network between the first network device and the second network device is recovered from a network error, the first network device detects that the sequence number between the first network device and the second network device is abnormal, for example, in a severely out-of-order state. In this case, the first network device initiates a sequence number resynchronization procedure.

Specifically, the first network device determines to perform the sequence number synchronization operation when the first network device determines, based on a sequence number in the received response packet, that a sequence number of the data packet received by the second network device is greater than the sequence number in the data packet sent by the first network device. In other words, if the second network device feeds back that a sequence number of a data packet that has not been sent by the first network device is received, it is determined that a current sequence number is seriously out of order.

When a sequence number in a response packet indicates a received sequence number, and the sequence number in the response packet is greater than a sequence number in a data packet sent by the first network device, the first network device detects that the sequence number between the first network device and the second network device is in the seriously out-of-order state. When the sequence number in the response packet indicates a next sequence number expected to be received, and the sequence number in the response packet minus 1 is still greater than the sequence number in the data packet sent by the first network device, the first network device detects that the sequence number between the first network device and the second network device is in the seriously out-of-order state.

Figure 8:
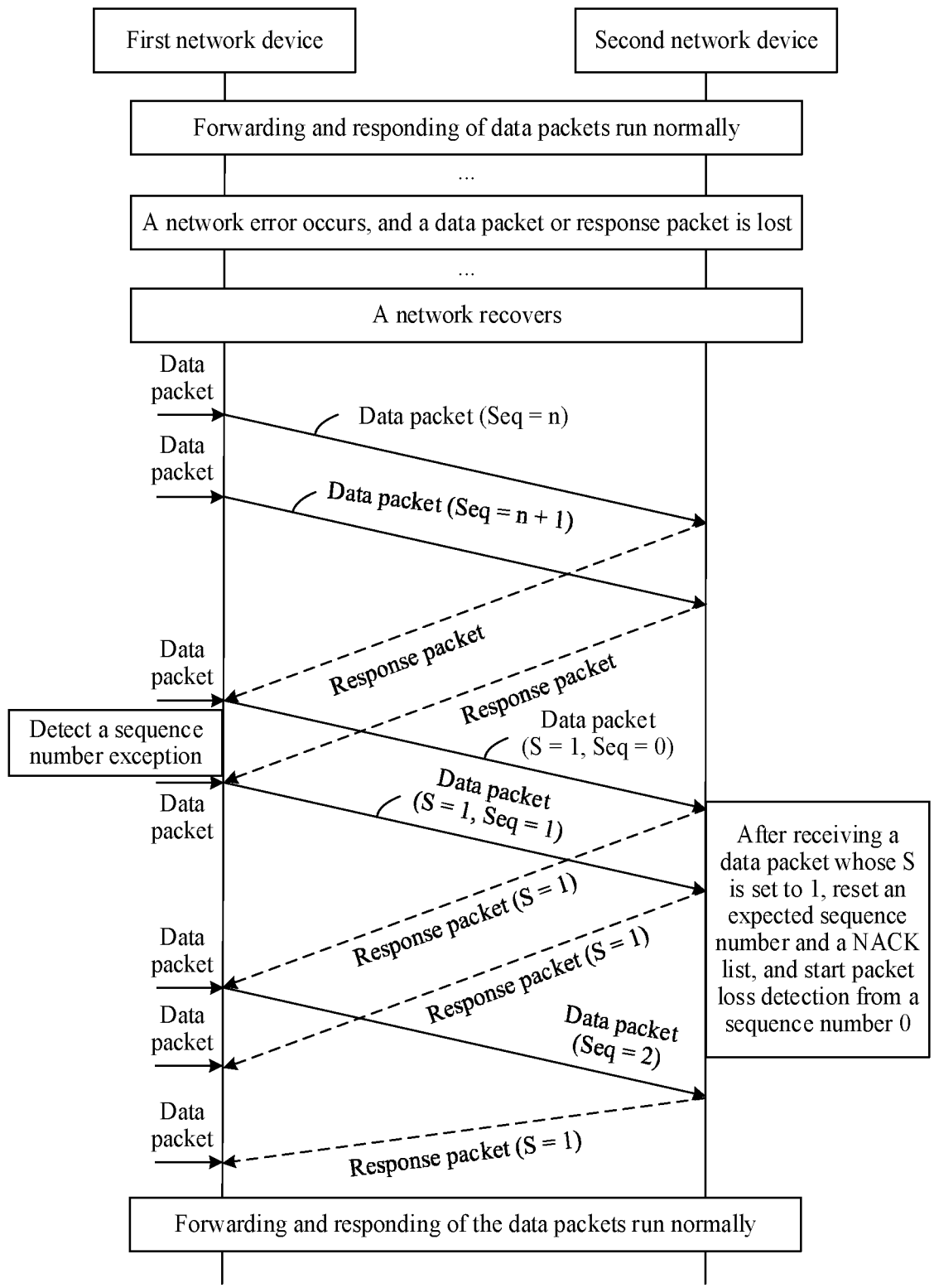
FIG. 8 is a schematic flowchart of another sequence number synchronization method according to an embodiment of this application.

As shown in FIG. 8, data packet forwarding and responding run normally between the first network device and the second network device. A data packet or a response packet is lost due to a network error between the first network device and the second network device. After the network recovers, the first network device continues forwarding a data packet to the second network device, and the first network device detects that the current sequence number is abnormal based on a received response packet sent by the second network device. For example, if the response packet indicates that a received sequence number is m, and m>n, the first network device sends a data packet including the first synchronization indication S=1 and Seq=0 to the second network device. When the second network device receives the data packet including S=1, the second network device determines to currently perform the sequence number synchronization operation, writes back S=1 in a corresponding response packet, resets the expected sequence number and the NACK list, and starts packet loss detection from the sequence number 0.

In the foregoing embodiments of this application, a sequence number synchronization operation between forwarding nodes is implemented by using an in-band synchronization indication. This avoids a separate sequence number synchronization negotiation and a delay in forwarding a data packet caused by the sequence number synchronization. In addition, a receive end needs to only write back a specific bit indicating synchronization to complete a sequence number synchronization procedure. This is easy to implement, and effectively resolves problems of sequence number synchronization and data packet loss.

An embodiment of this application further provides a sequence number synchronization apparatus. The apparatus may be a first network device, and may be configured to perform steps performed by the first network device in the foregoing sequence number synchronization method. The sequence number synchronization apparatus provided in this embodiment of this application may include modules corresponding to corresponding steps.

In the embodiments of this application, the sequence number synchronization apparatus may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. In this embodiment of this application, division into the modules is an example, and is merely logical function division. There may be another division manner during actual implementation.

Figure 9:
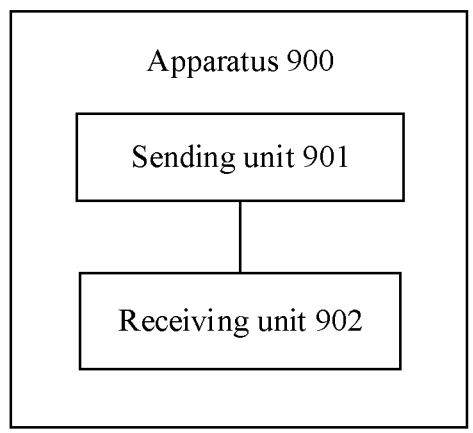
FIG. 9 is a schematic diagram of a structure of a sequence number synchronization apparatus according to an embodiment of this application.

When each functional module is obtained through division corresponding to each function, FIG. 9 is a possible schematic diagram of a structure of a sequence number synchronization apparatus 900. As shown in FIG. 9, the apparatus includes a sending unit 901 and a receiving unit 902.

The sending unit 901 may be configured to send a data packet including a first synchronization indication to a second network device, where the first synchronization indication is used to indicate the second network device and the first network device to perform a sequence number synchronization operation.

The receiving unit 902 may be configured to receive a response packet sent by the second network device, where the response packet includes a second synchronization indication, and the second synchronization indication is used to indicate that the second network device has received the packet including the first synchronization indication. Before the first network device receives a $1^{st}$ response packet including the second synchronization indication, the sending unit 901 is further configured to set the first synchronization indication in the data packet sent to the second network device.

Further, the apparatus 900 may be configured to perform another operation performed by the first network device in the foregoing method embodiments. Details are not described herein again in this embodiment of this application. For details, refer to related descriptions in the foregoing method embodiments.

Another embodiment of this application further provides a computer-readable storage medium. The computer-readable storage medium stores instructions, and when the instructions are run on the apparatus 900, the apparatus 900 performs the steps of the first network device according to the sequence number synchronization method in the foregoing embodiments.

In another embodiment of this application, a computer program product is further provided. The computer program product includes computer-executable instructions, and the computer-executable instructions are stored in the computer-readable storage medium. At least one processor of the apparatus 900 may read the computer-executable instructions from the computer-readable storage medium, and the at least one processor executes the computer-executable instructions, so that the apparatus 900 performs the steps of the first network device in sequence number synchronization in the foregoing embodiments.

Figure 10:
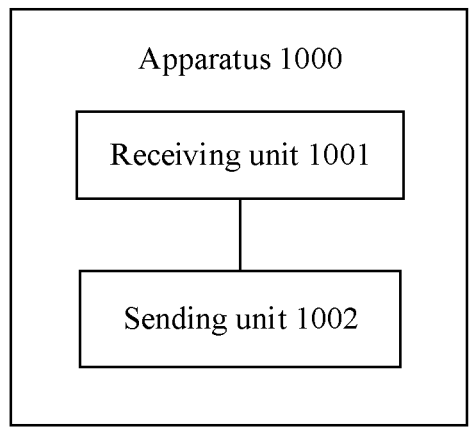
FIG. 10 is a schematic diagram of a structure of another sequence number synchronization apparatus according to an embodiment of this application.

An embodiment of this application further provides a sequence number synchronization apparatus. The apparatus may be a second network device. As shown in FIG. 10, the apparatus 1000 includes a receiving unit 1001 and a sending unit 1002.

The receiving unit 1001 is configured to receive a data packet including a first synchronization indication sent by the second network device, where the first synchronization indication is used to indicate a first network device and the second network device to perform sequence number synchronization.

The sending unit 1002 is configured to send a response packet to the second network device, where the response packet includes a second synchronization indication, and the second synchronization indication is used to indicate that the first network device receives the data packet including the first synchronization indication, where the first synchronization indication corresponds to the second synchronization indication.

Further, the apparatus 1000 may be configured to perform another operation performed by the second network device in the foregoing method embodiments. Details are not described herein again in this embodiment of this application. For details, refer to related descriptions in the foregoing method embodiments.

Another embodiment of this application further provides a computer-readable storage medium. The computer-readable storage medium stores instructions, and when the instructions are run on the apparatus 1000, the apparatus 1000 performs the steps of the second network device according to the sequence number synchronization method in the foregoing embodiments.

In another embodiment of this application, a computer program product is further provided. The computer program product includes computer-executable instructions, and the computer-executable instructions are stored in the computer-readable storage medium. At least one processor of the apparatus 1000 may read the computer-executable instructions from the computer-readable storage medium, and the at least one processor executes the computer-executable instructions, so that the apparatus 1000 performs the steps of the second network device in sequence number synchronization in the foregoing embodiments.

All or some of the foregoing embodiments may be implemented by software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data terminal device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

The foregoing descriptions about the implementations allow a person skilled in the art to clearly understand that, for the purpose of convenient and brief description, division into only the foregoing functional modules is used as an example for description. During actual application, the foregoing functions can be allocated to different functional modules for implementation as required. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual coupling or direct coupling or communication connections may be implemented through some interfaces. The indirect coupling or communication connections between the apparatuses or units may be implemented in electronic, mechanical, or other forms.

The units described as separate components may or may not be physically separate, and components displayed as units may be one or more physical units, in other words, may be located in one place, or may be distributed on a plurality of different places. Some or all of the units may be selected depending on actual requirements to achieve the objectives of the solutions in the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods in the embodiments of this application. The foregoing storage medium includes: any medium that can store program code, such as a Universal Serial Bus (USB) flash drive, a removable hard disk, a ROM, a RAM, a magnetic disk, or an optical disc.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A sequence number synchronization method implemented by a first network device, wherein the sequence number synchronization method comprises:
   until the first network device receives, from a second network device, a response packet that indicates that the second network device has received at least one of one or more first data packets and that comprises a second synchronization indication indicating a sequence number synchronization operation is complete:
   setting, in the at least one or more first data packets, a first synchronization indication for instructing the second network device and the first network device to perform the sequence number synchronization operation; and sending, to the second network device, the one or more first data packets; and receiving, from the second network device, the response packet.

2. The sequence number synchronization method of claim 1, wherein the first synchronization indication is carried in at least one bit, and wherein the sequence number synchronization method further comprises sending, to the second network device and subsequent to the first network device receiving the response packet-one or more second data packets that do not comprise the first synchronization indication.

3. The sequence number synchronization method of claim 2, further comprising:

setting a first sequence number in an initial data packet of the one or more first data packets to a preset sequence number or a random sequence number;

continuing sending a data packet until the first network device determines to perform the next sequence number synchronization operation, wherein sequence numbers in the data packet that is continued to be sent are consecutive; and resetting the sequence number in the data packet that is continued to be sent.

4. The sequence number synchronization method of claim 3, further comprising:

determining, based on a second sequence number in the response packet, that a third sequence number of a data packet received by the second network device is greater than the first sequence number; and determining to perform the sequence number synchronization operation when the third sequence number is greater than the first sequence number.

5. The sequence number synchronization method of claim 4, further comprising further determining to perform the sequence number synchronization operation when the first network device is initialized or the first network device restarts.

6. The sequence number synchronization method of claim 5, wherein each of the one or more first data packets comprises an overlay tunnel header, and wherein the first synchronization indication and the first sequence number are encapsulated in the overlay tunnel header.

7. The sequence number synchronization method of claim 1, wherein the first synchronization indication is carried in a first field that comprises at least one bit, and wherein setting the first synchronization indication in the one or more first data packets comprises:

setting a value of the first field to a first preset value; and updating the value determining to perform a next sequence number synchronization operation.

8. A sequence number synchronization method implemented by a first network device, wherein the sequence number synchronization method comprises:

receiving one or more data packets from a second network device, wherein each of the one or more data packets comprises a first synchronization indication that instructs the first network device and the second network device to perform sequence number synchronization; and sending, to the second network device, a first response packet comprising a second synchronization indication indicating that the first network device has received the one or more data packets and indicating the sequence number synchronization operation is complete, wherein the first synchronization indication corresponds to the second synchronization indication.

9. The sequence number synchronization method of claim 8, further comprising sending, to the second network device, a second response packet that does not comprise the second synchronization indication when the first network device receives a data packet that is from the second network device and that does not comprise the first synchronization indication.

10. The sequence number synchronization method of claim 8, further comprising:

receiving at least two data packets from the second network device, wherein the at least two data packets comprise the one or more data packets, the first synchronization indication, and first sequence numbers that are different; and sending, to the second network device, at least two corresponding response packets that comprise the first response packet, the second synchronization indication, and second sequence numbers corresponding to the at least two data packets.

11. The sequence number synchronization method of claim 10, wherein each of the at least two data packets comprises an overlay tunnel header, and wherein the first synchronization indication and a respective sequence number of the first sequence numbers is encapsulated in the overlay tunnel header of each of the at least two data packets.

12. A first network device, comprising:

one or more processors; and a memory configured to store a program to be executed by the one or more processors, wherein when executed by the one or more processors, the program is configured to cause the first network device to:

until the first network device receives, from a second network device, a response packet that indicates that the second network device has received at least one of one or more first data packets and that comprises a second synchronization indication indicating a sequence number synchronization operation is complete:

set, in the one or more first data packets, a first synchronization indication for instructing the second network device and the first network device to perform the sequence number synchronization operation; and send, to the second network device, the one or more first data packets; and receive, from the second network device, the response packet.

13. The first network device of claim 12, wherein the first synchronization indication is carried in at least one bit, and wherein when executed by the one or more processors, the program further causes the first network device to send, to the second network device and subsequent to the first network device receiving the response packet, one or more second data packets that do not comprise the first synchronization indication.

14. The first network device of claim 13, wherein when executed by the one or more processors, the program further causes the first network device to:

set a first sequence number in an initial data packet of the one or more data packets to a preset sequence number or a random sequence number;

continue sending a data packet until the first network device determines to perform the next sequence number synchronization operation, wherein sequence numbers in the data packet that are continued to be sent are consecutive; and reset the sequence number in the data packet that is continued to be sent.

15. The first network device of claim 14, wherein when executed by the one or more processors, the program further causes the first network device to:

determine, based on a second sequence number in the response packet, that a third sequence number of a data packet received by the second network device is greater than the first sequence number; and determine to perform the sequence number synchronization operation when the third sequence number is greater than the first sequence number.

16. The first network device of claim 12, wherein the first synchronization indication is carried in a first field that comprises at least one bit, and wherein when executed by the one or more processors, the program further first network device to:

set a value of the first field to a first preset value; and update the value when the first network device determines to perform a next sequence number synchronization operation.

17. A first network device, comprising:

one or more processors; and a memory configured to store a program to be executed by the one or more processors, wherein when executed by the one or more processors, the program causes the first network device to:

receive one or more data packets from a second network device, wherein each of the one or more data packets comprises a first synchronization indication that instructs the first network device and the second network device to perform sequence number synchronization; and send, to the second network device, a first response packet comprising a second synchronization indication indicating that the first network device has received the one or more data packets and indicating a sequence number synchronization operation is complete, wherein the first synchronization indication corresponds to the second synchronization indication.

18. The first network device of claim 17, wherein when executed by the one or more processors, the program causes the first network device to send, to the second network device, a second response packet that does not comprise the second synchronization indication when the first network device receives a data packet that is from the second network device and that does not comprise the first synchronization indication.

19. The first network device of claim 17, wherein when executed by the one or more processors, the program causes the first network device to:

receive at least two data packets from the second network device, wherein the at least two data packets comprise the one or more data packets, the first synchronization indication, and first sequence numbers that are different; and send at least two corresponding response packets that comprise the first response packet, the second synchronization indication, and second sequence numbers corresponding to the at least two data packets.

20. The first network device of claim 19, wherein each of the at least two data packets comprises an overlay tunnel header, and wherein the first synchronization indication and a respective sequence number of the first sequence numbers are encapsulated in the overlay tunnel header of each of the at least two data packets.

* * * * *

UNITED STATES PATENT AND TRADEMARK OFFICE
CERTIFICATE OF CORRECTION

PATENT NO. : 12,323,335 B2
APPLICATION NO. : 17/705882
DATED : June 3, 2025
INVENTOR(S) : Xingwang Zhou et al.

Page 1 of 1

It is certified that error appears in the above-identified patent and that said Letters Patent is hereby corrected as shown below:

In the Claims

Claim 2, Column 23, Line 13:
"receiving the response packet-one or more second data"
Should read:
receiving the response packet, one or more second data Signed and Sealed this
Twenty-fifth Day of November, 2025

John A. Squires
*Director of the United States Patent and Trademark Office*